United States Patent
Korssell

(10) Patent No.: US 7,609,010 B2
(45) Date of Patent: Oct. 27, 2009

(54) INVERTER

(75) Inventor: Thomas Korssell, Täby (SE)

(73) Assignee: Dometic Sweden AB, Solna (SE)

( * ) Notice: Subject to any disclaimer, the term of this patent is extended or adjusted under 35 U.S.C. 154(b) by 390 days.

(21) Appl. No.: 10/561,694

(22) PCT Filed: Jun. 23, 2004

(86) PCT No.: PCT/SE2004/001011

§ 371 (c)(1), (2), (4) Date: Jun. 22, 2006

(87) PCT Pub. No.: WO2005/002040

PCT Pub. Date: Jan. 6, 2005

(65) Prior Publication Data

US 2007/0096671 A1 May 3, 2007

(30) Foreign Application Priority Data

Jun. 30, 2003 (SE) .................................. 0301926

(51) Int. Cl.
*G06F 7/00* (2006.01)
*H02P 5/00* (2006.01)

(52) U.S. Cl. ............. 318/139; 318/400.03; 318/400.09; 308/10.1; 308/10.6; 320/104; 320/138

(58) Field of Classification Search ................ 318/140, 318/153, 139, 701, 801, 400.03, 400.09; 290/36 R; 307/10.1, 10.6; 320/104, 116; 332/14, 19, 23

See application file for complete search history.

(56) References Cited

U.S. PATENT DOCUMENTS 3,875,483 A 4/1975 Farr
5,412,251 A * 5/1995 Furutani et al. ............... 290/16
5,497,070 A * 3/1996 Furutani et al. ............... 322/23
5,550,445 A * 8/1996 Nii .............................. 318/153
5,751,137 A * 5/1998 Kiuchi et al. .................. 322/14
5,778,997 A * 7/1998 Setaka et al. ............... 180/65.2
5,804,947 A * 9/1998 Nii et al. ........................ 322/16

(Continued)

FOREIGN PATENT DOCUMENTS

EP 0 645 278 3/1995

(Continued)

*Primary Examiner*—Paul Ip
(74) *Attorney, Agent, or Firm*—Pearne & Gordon LLP

(57) ABSTRACT

The present invention relates to an inverter and a method for converting direct current voltage to alternating current. The inverter comprises a first input arranged to be connected to the ordinary current supply system of a vessel, where the current supply system comprises a generator connected to a battery, and an output, and an output arranged to be connected to an alternating current motor, where, for at least a period of time, the alternating current motor requires a first torque $M_1$ in order to rotate. The inverter comprises, in addition, a regulating circuit arranged to measure a charging current from the generator to the battery and to measure the voltage level in the battery. The regulating circuit is, in addition, arranged to permit a certain output current from the vessel's ordinary current supply system to the inverter which is higher than the charging current, in a first operating mode. The regulating circuit is, in addition, arranged to limit the output current while maintaining the torque for the alternating current motor, in a second operating mode.

14 Claims, 4 Drawing Sheets

U.S. PATENT DOCUMENTS

| | | | |
|---|---|---|---|
| 5,899,411 A * | 5/1999 | Latos et al. | 244/53 A |
| 6,121,740 A * | 9/2000 | Gale et al. | 318/376 |
| 6,175,217 B1 * | 1/2001 | Da Ponte et al. | 322/19 |
| 6,396,161 B1 * | 5/2002 | Crecelius et al. | 290/36 R |
| 6,426,608 B2 * | 7/2002 | Amano et al. | 320/163 |
| 6,461,266 B1 * | 10/2002 | Weisz | 475/5 |
| 6,518,736 B2 * | 2/2003 | Sasaki et al. | 322/16 |
| 6,645,017 B1 * | 11/2003 | Skrzypek et al. | 440/6 |
| 6,703,808 B1 * | 3/2004 | Blackburn et al. | 318/701 |
| 6,726,588 B2 * | 4/2004 | Weisz | 475/5 |
| 6,794,847 B2 * | 9/2004 | Hosoda et al. | 320/104 |
| 6,812,670 B2 * | 11/2004 | Minamiura et al. | 320/116 |
| 6,861,767 B2 * | 3/2005 | Amano et al. | 307/10.1 |
| 6,995,480 B2 * | 2/2006 | Amano et al. | 307/10.1 |
| 7,015,676 B2 * | 3/2006 | Kohama et al. | 320/150 |
| 7,119,513 B2 * | 10/2006 | Ishikawa | 318/801 |
| 7,157,869 B2 * | 1/2007 | Ishikawa | 318/139 |
| 7,322,331 B2 * | 1/2008 | Tamagawa et al. | 123/179.3 |
| 7,379,855 B1 * | 5/2008 | Oda et al. | 703/14 |
| 7,420,295 B2 * | 9/2008 | Omae et al. | 307/66 |
| 7,459,801 B2 * | 12/2008 | Shimoyama et al. | 290/40 B |
| 2002/0160873 A1 * | 10/2002 | Weisz | 475/5 |
| 2002/0193197 A1 * | 12/2002 | Weisz | 475/5 |
| 2004/0155624 A1 * | 8/2004 | Amano et al. | 320/104 |
| 2004/0239289 A1 * | 12/2004 | Pfab et al. | 320/104 |
| 2005/0063117 A1 * | 3/2005 | Amano et al. | 361/90 |
| 2005/0253458 A1 * | 11/2005 | Omae et al. | 307/10.1 |
| 2006/0152180 A1 * | 7/2006 | Tahara et al. | 318/139 |
| 2007/0052243 A1 * | 3/2007 | Shimoyama et al. | 290/40 B |

FOREIGN PATENT DOCUMENTS

WO     WO 01/89070     11/2001

* cited by examiner

INVERTER

TECHNICAL FIELD

The present invention relates to a method and an apparatus for supplying current to an alternating current apparatus in a vehicle. In particular, the present invention relates to a method and an apparatus for supplying current to an alternating current apparatus in a vehicle in such a way that the supply of current to other electronics is guaranteed.

BACKGROUND ART

The generation of current in vessels is normally carried out using a generator connected to a battery. The generator is driven by the vessel's combustion motor and charges the battery. During operation of the vessel, there is a continual charging of the battery, while at the same time power is provided for the vessel's electronics. When the combustion motor is switched off, the battery, which has a limited amount of available power, is used to provide current for the electronics.

In order to generate alternating current for alternating current applications in the vessel, a DC/AC transducer, or inverter, is used to convert the direct current voltage of the battery to an alternating current voltage of a certain frequency.

Alternating current applications, for example alternating current motors with large starting torque, can require a lot of current. Such an application can, for example, be a compressor in a refrigeration system. When the alternating current motor is started, large starting currents are required. A single-phase alternating current motor can have a current requirement when it starts that is four to eight times the current requirement in normal operation. This creates a number of problems.

For example, the starting current requirement must be taken into account when selecting the inverter. A standard inverter which can drive a motor of 1 kW, that is which is rated at 1 kW, will not manage to start an alternating current motor with high starting torque. It may be the case that an inverter rated at 2 kW is required in order to start the motor, which in turn means that an unnecessarily large and expensive inverter is used during normal operation when the alternating current motor draws normal current.

Another problem is that the high starting currents can jeopardize the other electronics in the vessel, which are electronics that can be vital for being able to operate the vessel in a safe way. That is to say, if the alternating current application draws too large currents, the voltage across the battery can drop so that other electronics can not be supplied with current. This is, of course, a situation that must not arise.

WO 01/89070 describes a circuit in a vehicle. When the battery voltage drops below a certain level, the circuit increases the voltage up to the voltage required by the load.

DISCLOSURE OF INVENTION

The principal object of the present invention is thus to provide a method and an apparatus that solve or at least reduce the abovementioned problems.

A particular object of the present invention is to provide a method and an apparatus that provide a cost-effective and safe power supply for an alternating current apparatus in a vehicle.

A particular object of the present invention is to provide a method and an apparatus that enable an apparatus in a vehicle, which apparatus is connected via a DC/AC transducer to a battery which is charged by a generator and which apparatus requires a larger starting current than the running current, to be started in a safe way and operated without the function of other electronics that are connected to the battery being jeopardized.

The abovementioned objects are achieved according to a first aspect of the present invention by an inverter for converting direct current voltage to alternating current voltage. The inverter comprises a first input arranged to be connected to the ordinary current supply system of a vessel, where the current supply system comprises a generator connected to a battery and an output arranged to be connected to an alternating current motor, where, for at least a period of time, the alternating current motor requires a first torque $M_1$ in order to rotate.

The inverter comprises, in addition, a regulating circuit arranged to measure a charging current from the generator to the battery and to measure the voltage level in the battery. The regulating circuit is, in addition, arranged to permit a certain output current from the vessel's ordinary current supply system to the inverter which is higher than the charging current, in a first operating mode. The regulating circuit is, in addition, arranged to limit the output current while maintaining the torque for the alternating current motor, in a second operating mode.

The abovementioned objects are achieved according to a second aspect of the present invention by a method for supplying current to an apparatus in a vehicle which has an ordinary current supply system. The ordinary current supply system comprises a battery which is charged by a generator, and the vehicle comprises, in addition, an inverter that has an input connected to the ordinary current supply system and an output connected to the apparatus in order to supply the apparatus with an alternating current.

The method comprises measuring a charging current from the generator to the battery, permitting an output current from the ordinary current supply system to the inverter in a first operating mode for supplying current to the apparatus, and limiting the output current from the ordinary current supply system to the inverter in a second operating mode, while maintaining the torque for the apparatus.

Advantageous alternatives and embodiments of the present invention are provided by methods and apparatuses according to the attached subsidiary claims.

According to a preferred embodiment of the present invention, the regulating circuit is arranged to assume a first operating mode if said battery voltage is above a limit value for the battery voltage, and a second operating mode when the battery voltage is below the limit value for the battery voltage, in order thereby to prevent the battery voltage from dropping still further.

By limiting the output current when the battery voltage drops below a certain level, the function of other electronics connected to the ordinary current supply system is guaranteed.

According to a preferred embodiment of the present invention, the inverter comprises a second input on which a signal can be applied, with the regulating circuit being arranged to assume the first operating mode when the signal assumes a first value and the second operating mode when the signal assumes a second value.

By limiting the current output in response to an external signal, the power consumption of the alternating current motor can be controlled and hence the energy consumption can be controlled. If the alternating current motor drives, for example, a compressor for a refrigeration unit, the temperature in the refrigeration unit can be controlled.

According to a preferred embodiment of the present invention, the inverter comprises a second input on which a signal can be applied, with the regulating circuit being arranged to assume the first operating mode when the signal assumes a first value and the second operating mode when the signal assumes a second value. In addition, the regulating circuit is arranged to assume the first operating mode only if the battery voltage is above a limit value for the battery voltage.

By this means, the function of other electronics connected to the ordinary current supply system is guaranteed, while at the same time external control of the inverter is made possible.

According to a preferred embodiment of the present invention, the signal on the second input can assume a number of values, with the signal value being proportional to a maximal output current level to which the regulating circuit limits the output current.

By this means, a stepless or stepped control is achieved of the power that is to be supplied to the alternating current motor.

According to a preferred embodiment of the present invention, the limiting of the output current is carried out by reducing the voltage and the frequency applied to the alternating current motor in such a way that the ratio between the voltage and the frequency remains constant, while the current to the alternating current motor remains constant.

By this means, the power supplied to said alternating current motor is reduced without the torque being reduced. As a result of the power that is supplied to the alternating current motor being reduced, the output current which is taken from the ordinary current supply system to the inverter will also be reduced.

According to a preferred embodiment of the present invention, the regulating circuit is arranged to measure the current output from the vessel's ordinary current supply system, and to limit the current output from said vessel's ordinary current supply system to a limit value for the output current if the current output exceeds the limit value for the output current.

According to a preferred embodiment of the present invention, the regulating circuit measures the current output by measuring the magnetic field using a Hall element.

By measuring the current output and limiting the current output, a safety function is achieved so that the supply of current to other electronics can still be carried out. The limiting of the current output is suitably carried out by reducing the voltage and the frequency to the alternating current motor, while retaining the V/f ratio, while the current to the alternating current motor remains constant.

According to a preferred embodiment of the present invention, the battery voltage is measured at said battery.

If the battery voltage is measured at the battery rather than at the input of the inverter, a better measurement value for the battery voltage is obtained, as a certain drop in voltage will unavoidably have occurred at the input of the inverter.

According to a preferred embodiment of the present invention, the output current is measured by measuring the rotational speed of said generator, for example by measuring the ripple on said battery voltage.

The nominal battery voltage can be, for example, 12 V, 24 V, 48 V, etc. The nominal alternating current voltage and frequency for the alternating current motor can, for example, be 230 V 50 Hz, which gives a V/f ratio of 4.6, but other values are, of course, possible.

Additional characteristics of the invention and advantages thereof will be apparent from the following detailed description of embodiments according to the invention.

BRIEF DESCRIPTION OF DRAWINGS

The present invention will be better understood from the following detailed description of preferred embodiments according to the present invention and the attached FIGS. 1 to 4, which are only intended to illustrate the preferred embodiments and do not restrict the present invention.

MODE(S) FOR CARRYING OUT THE INVENTION

In the following description, specific techniques and applications are described for the purpose of providing a basic understanding of the present invention. However, it will be obvious to experts in the field that the present invention can be implemented in other embodiments that differ from what is described here in detail. In other cases, detailed descriptions of well-known methods and apparatuses have been omitted in order not to complicate the description of the present invention with unnecessary components.

A motor from a manufacturer is optimized to be able to produce a specific torque at a specific voltage and a specific frequency. The torque is directly linked to the magnetic flow in the stator, the static windings in the motor and in the rotor, the rotating part of the motor. The flow in the motor is a function of the ratio between the measured voltage and frequency. That is, the ratio between voltage and frequency, hereafter called the V/f ratio, is to be constant in order to maintain the optimized performance of the motor, that is flow and hence torque. What happens in practice is that, with a lower applied V/f ratio, the power to the load is reduced.

The problem affecting the motor that can arise in the event of adjusting the V/f ratio is that the refrigeration is insufficient as the motor is rotating at a lower speed while, at the same time, the same current is being drawn as for a full load. That is, the resistive losses in the motor will be equally large at low motor speed as at high motor speed. It should, however, be pointed out that this is a manageable problem and usually does not cause any great problems, provided there is awareness of the control principle when designing the system.

To sum up, it is the case that, with V/f ratio adjustment, the voltage to the load is reduced, while the current remains the same size, or drops to a lower level. This means that the generated output power is reduced, while the load torque remains the same. The disadvantage can be problems relating to refrigeration characteristics and lubrication in the application.

Figure 1:
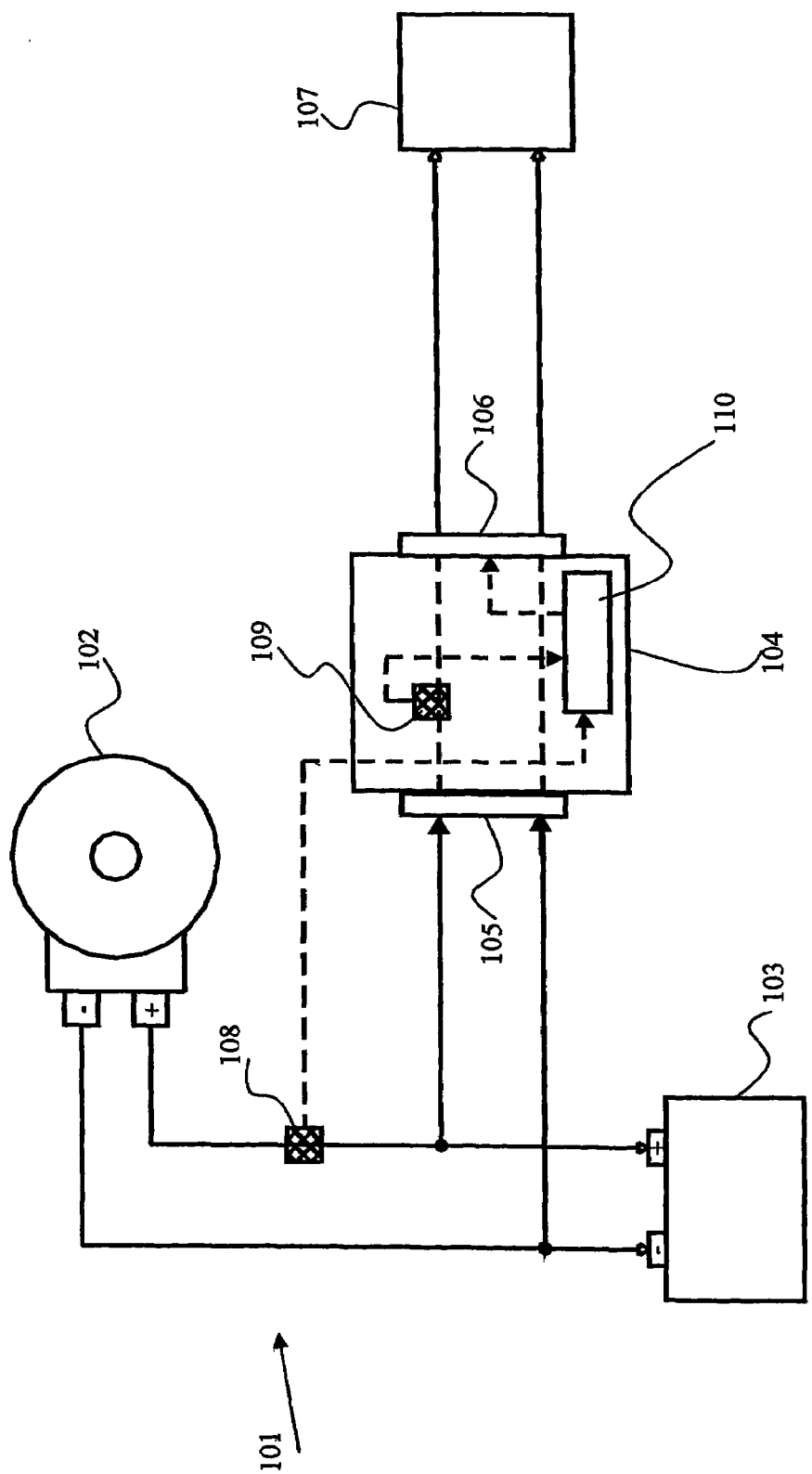
FIG. 1 shows schematically a preferred embodiment according to the present invention.

FIG. 1 shows schematically a preferred embodiment of the present invention where a generator 102 is connected to a battery 103 which consists schematically of a vessel's ordinary current supply system 101. Other electronics (not shown) are also connected to the current supply system 101. A DC to AC transducer, also called an inverter, 104 is connected to the ordinary current supply system 101 via an input 105. An output 106 from the inverter 104 is connected to an alternating current load 107, for example an alternating current motor. The inverter 104 also comprises a regulating circuit 110 which controls the voltage, the current and the frequency that are applied to the alternating current load 107.

A current sensor 108 that detects the charging current from the generator 102 to the battery 103 is connected to the regulating circuit 110. The inverter 104 also comprises an internal current and voltage sensor 109 which measures the current and the voltage that enter the inverter 104 at the input 105 which is connected to the regulating circuit 110.

When the alternating current load 107 is started, the load 107 will draw considerably more current than during normal operation. An increased current consumption of four to eight times is not abnormal. The regulating circuit 110 monitors the current consumption from the current supply system 161 and, if the current consumption is larger than a certain limit value, the regulating circuit 110 limits the voltage and the frequency to the load 107 so that the current output from the current supply system 101 remains below the limit value. This is a quick safety function which guarantees that no extreme and sudden current peaks interfere with the current supply system 101 or the inverter 104.

The regulating circuit also monitors the charging current from the generator 102 to the battery 103 via a current sensor 108. The regulating circuit permits the output current from the ordinary current supply system 101 to the inverter 104 to be larger than the charging current for a certain period of time. This will mean that the battery 103 is slowly discharged. When the voltage in the battery 103, which is monitored by a sensor 109, reaches a limit value for the minimum battery voltage, the regulating circuit reduces the voltage and the frequency to the load 107 while retaining the same ratio, while at the same time the current to the load 107 is kept constant. By this means, the current output from the ordinary current supply system 101 is reduced, while at the same time the torque to the load 107 is maintained. The regulating circuit 110 reduces the voltage and the frequency until the output current is the same size as or smaller than the charging current. The battery 103 will then no longer be discharged and the function of other electronics connected to the ordinary current supply system is guaranteed.

Figure 2:
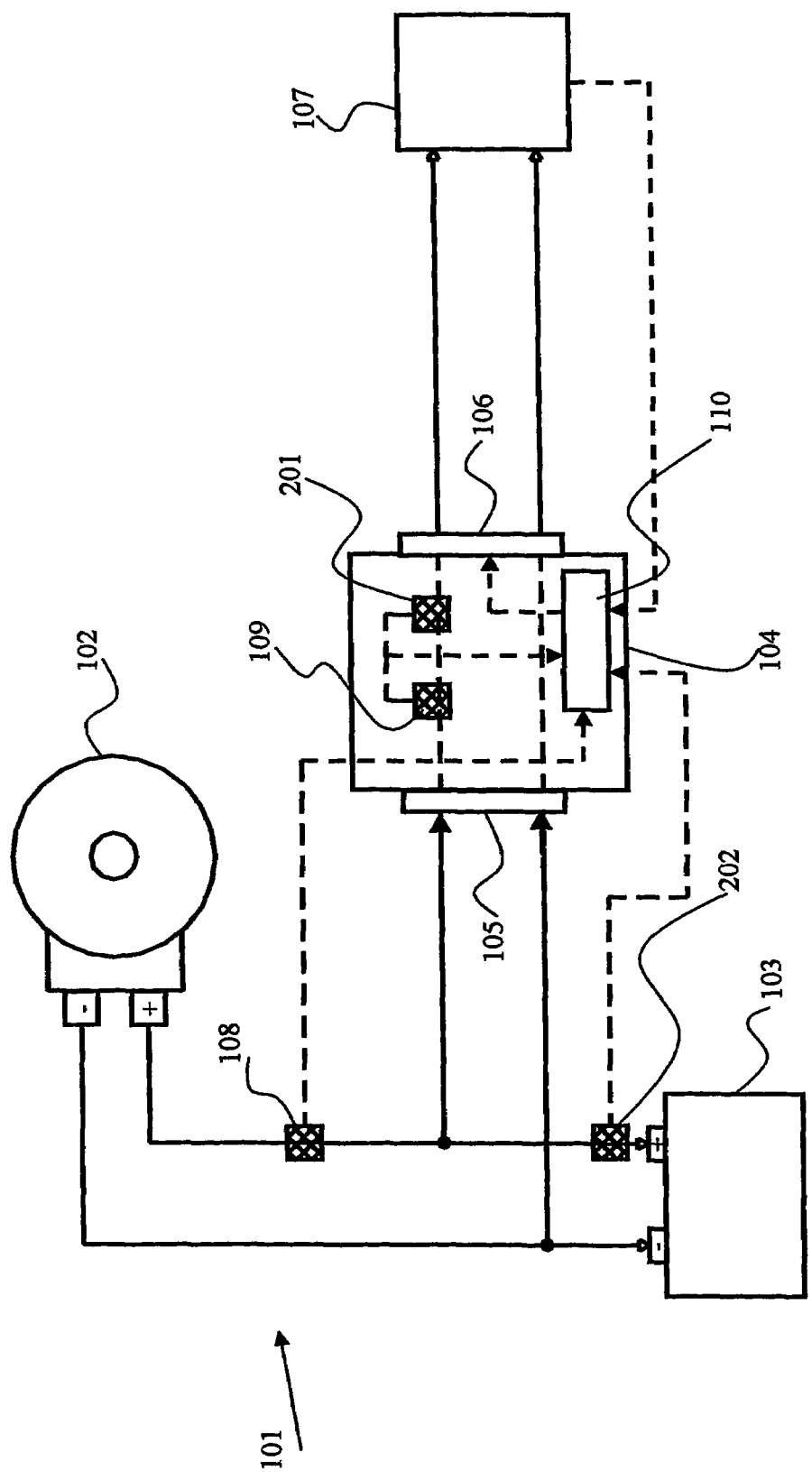
FIG. 2 shows schematically an additional preferred embodiment according to the present invention, a sensor for detecting the charging current and a sensor for detecting the battery voltage at the poles of the battery.

FIG. 2 shows schematically a preferred embodiment according to the present invention where additional sensors are introduced in comparison to the embodiment described in association with FIG. 1. The same components have been given the same reference numerals in FIG. 2 as in FIG. 1.

A generator rotational speed sensor 201 measures the rotational speed of the generator 102 by measuring the ripple frequency of the battery supply voltage. Alternatively, the rotational speed of the generator is obtained from the vessel's rotational speed monitor. The rotational speed of the generator provides a measurement of the available power in the ordinary current supply system and can be used for controlling the power that is applied to the load 107.

A voltage sensor 202 arranged on the battery 103 measures the battery voltage and is connected to the regulating circuit 110. By measuring the voltage in the battery 103 at the battery poles, rather than at the input 105 of the inverter 104, a better value is obtained for the battery voltage. This is the case as there is a drop in voltage between the battery 102 and the input 105.

In the present embodiment, the inverter 104 also comprises a second input arranged to receive a signal for controlling the regulation function, that is the voltage, frequency and current applied to the load 107. In the present embodiment, the control comes from the load 107, which, for example, can be a refrigeration system comprising a compressor for refrigeration, with the control from the refrigeration system to the regulating circuit regulating the refrigeration power.

In addition, there is undervoltage protection in the inverter 104, which prevents the load 107 from being started if the battery voltage is below a certain level. There is also overvoltage protection in the inverter 104, which protects the inverter 104 against abnormally high charging voltages at the input 105. Thermal protection is also implemented, which protects the inverter 104 against overheating, and polarity protection which protects against connection with incorrect polarity.

It will be obvious to experts in the field that all the controls and sensors that have been described in the same embodiment in association with FIG. 2 can be implemented together in any combination or individually. For example, the generator rotational speed measurement by the sensor 201 can replace the measurement of the charging current by the sensor 104.

Figure 3:
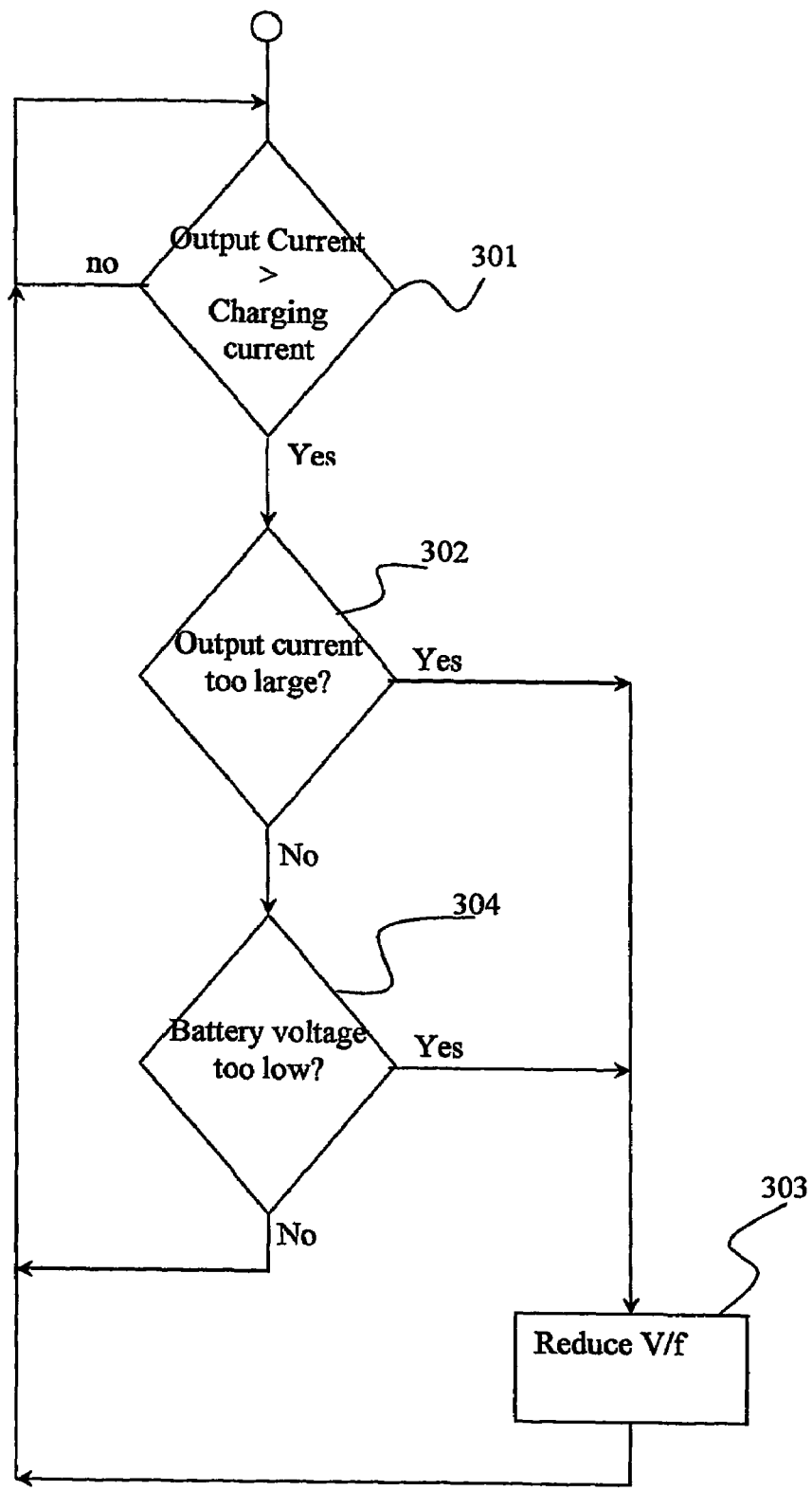
FIG. 3 is a schematic flow chart of a preferred embodiment according to the present invention.

FIG. 3 shows a schematic flow chart according to a preferred embodiment of the present invention. It is first checked in step 301 whether the output current from the ordinary current supply system 101 is larger than the charging current. If this is not the case, no further measures need to be taken concerning the regulation of the voltage, frequency and current to the load 107. Otherwise, it is checked in step 302 whether the output current is larger than a maximal current output, and if such is the case, the ratio voltage divided by frequency (V/f) that is applied to the load is adjusted downward in step 303, while retaining the strength of the current. If the current output is not larger than the maximal current output, it is checked in step 304 whether the battery voltage is too low. In order to obtain a reliable and stable value for the battery voltage, the measurements are integrated over a certain period of time, for example one minute. If the battery voltage is too low, the V/f ratio is adjusted downward in step 303, so that the output current does not exceed the charging current.

Figure 4:
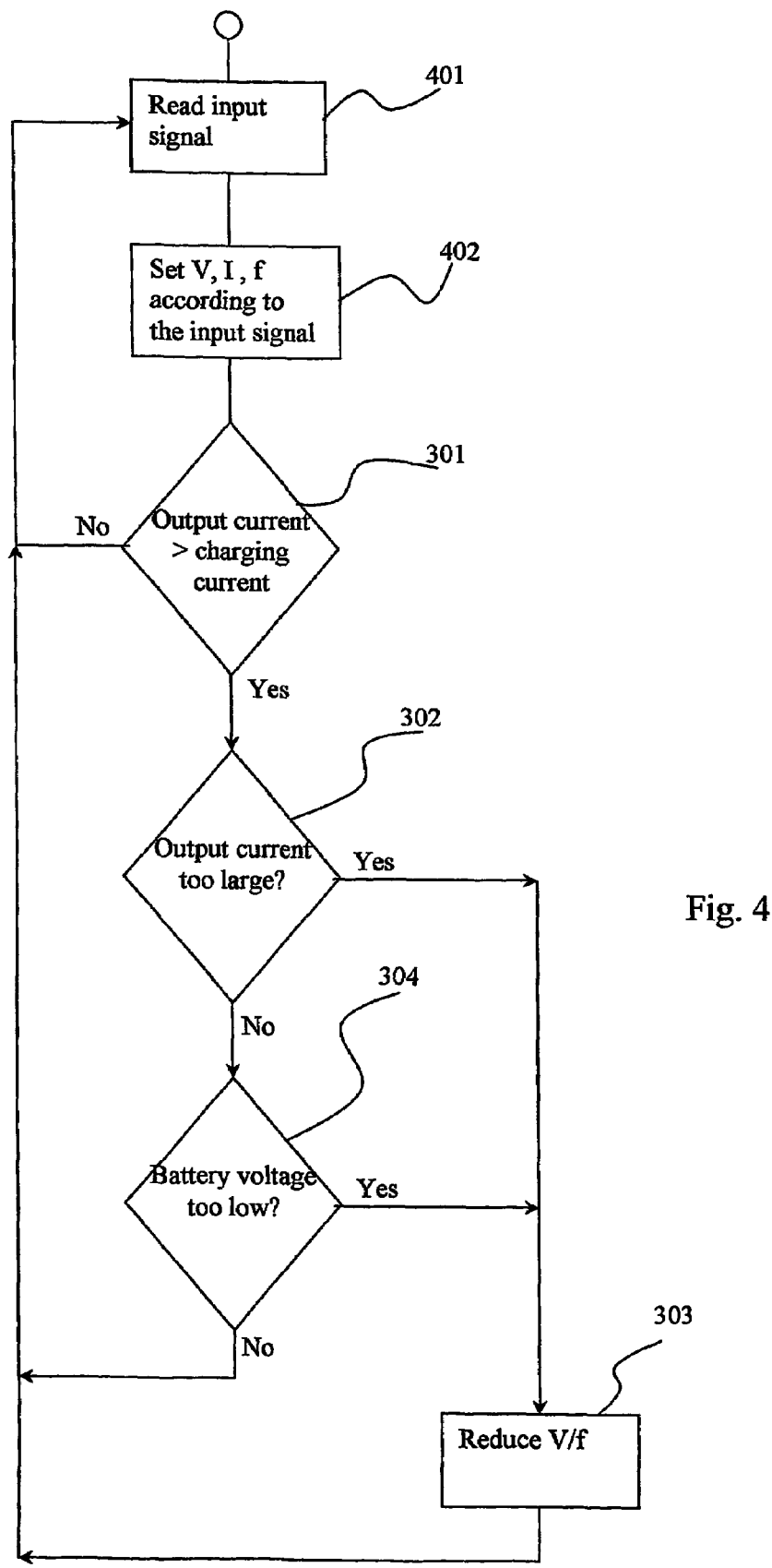
FIG. 4 is a schematic flow chart of a preferred embodiment according to the present invention in which an input signal indicates voltage, current and frequency of a load.

FIG. 4 shows a schematic flow chart of a preferred embodiment of the present invention. The same components in FIG. 4 as in FIG. 3 have been given the same reference numerals.

In the embodiment according to FIG. 4, the inverter 104 receives an input signal on a second input that indicates which values are to be applied to the load 107 relating to voltage, current and frequency. In step 401, the value of the input signal is read and, in step 402, values for voltage (V), current (I) and frequency (f) that are applied on the load 107 are set to the values that were given in the input signal. Thereafter, the signal is regulated according to the same principles as given in association with FIG. 3. By this means, it is guaranteed that incorrect values of the input signal do not mean that the function of the vessel's electronics is jeopardized.

It is obvious that the present invention can be varied in many different ways. Such variations are not to be perceived as deviating from the scope of the present invention. All such modifications that are obvious to experts in the field are intended to be included within the scope of the attached claims.

The invention claimed is:

1. An inverter for converting direct current voltage to alternating current voltage comprising:
    a first input arranged to be connected to a vessel's ordinary current supply system, where said current supply system comprises a generator connected to a battery, and
    an output arranged to be connected to an alternating current motor, where, for at least a period of time, said alternating current motor requires a first torque $M_1$ in order to rotate, wherein a regulating circuit is arranged to measure a charging current from said generator to said battery and to measure the voltage level in said battery, said regulating circuit is, in addition, arranged to permit an output current from said vessel's ordinary current supply system to said inverter which is higher than said charging current, in a first operating mode and said regulating circuit is arranged to limit said output current while maintaining the torque for said motor, in a second operating mode, said regulating circuit is arranged to assume said first operating mode if said battery voltage is over a limit value for the battery voltage, and said regulating circuit is arranged to assume said second operating mode when said battery voltage is below said limit value for the battery voltage, in order thereby to prevent said battery voltage from dropping further.

2. The inverter as claimed in claim 1, wherein said inverter comprises a second input, on which second input a signal can be applied, said regulating circuit is arranged to assume said first operating mode when said signal assumes a first value, and said regulating circuit is arranged to assume said second operating mode when said signal assumes a second value.

3. The inverter as claimed in claim 2, wherein said regulating circuit is arranged to assume said first operating mode only if said battery voltage is above a limit value for the battery voltage.

4. The inverter as claimed in claim 2, wherein said signal can assume a number of values, with said signal value being proportional to a maximal output current level to which said regulating circuit limits said output current.

5. The inverter as claimed in claim 1, wherein said limiting of the output current is carried out by reducing the voltage and the frequency applied to said alternating current motor in such a way that the ratio between said voltage and frequency is constant, while the current to said alternating current motor is kept constant, in order thereby to reduce the power supplied to said alternating current motor without reducing said torque.

6. The inverter as claims in claim 1, wherein said limit value for said battery voltage is set in such a way that the function of other electronics that are supplied with power from said battery is guaranteed.

7. The inverter as claimed in claim 1, wherein said regulation circuit is arranged to measure said current output from said vessel's ordinary current supply system, and said regulating circuit is arranged to limit said current output from said vessel's ordinary current supply system to a limit value for an output current, if said current output exceeds said limit value for the output current.

8. The inverter as claimed in claim 7, wherein said regulating circuit measures said current output by measuring the magnetic field with a Hall element.

9. The inverter as claimed in claim 1, wherein the battery voltage is measured at said first input to said inverter.

10. The inverter as claimed in claim 1, wherein the battery voltage is measured at said battery.

11. The inverter as claimed in claim 1, wherein said output current is measured by measuring the rotational speed of said generator.

12. The inverter as claims in claim 11, wherein the rotational speed of said generator is measured by measuring the ripple on said battery voltage.

13. A method for supplying current to an apparatus in a vehicle than has an ordinary current supply system, said ordinary current supply system comprising a battery which is charged by a generator, said vehicle comprising, in addition, an inverter that has an input connected to said ordinary current supply system and are output connected to said apparatus for supplying said apparatus with an alternating current, the method comprising the steps of:

measuring a charging current from said generator to said battery, permitting an output current from said ordinary current supply system to said inverter during a first operating mode for supplying said apparatus with current, limiting said output current from said ordinary current supply system to said inverter during a second operating mode, while retaining the torque to said apparatus, and measuring the battery voltage, assuming said first operating mode if said battery voltage is above a limit value for the battery voltage, and assuming said second operating mode when said battery voltage is below said limit value for the battery voltage, in order thereby to prevent said battery voltage from dropping still further.

14. The method as claimed in claim 13, wherein said limiting of the output current is carried out by reducing the voltage and the frequency of said alternating current that is applied to said apparatus so that the ratio between said voltage and frequency is constant while the current to said apparatus is kept constant, in order thereby to reduce the power applied to said apparatus without reducing said torque.

* * * * *

UNITED STATES PATENT AND TRADEMARK OFFICE
CERTIFICATE OF CORRECTION

| | | |
|---|---|---|
| PATENT NO. | : 7,609,010 B2 | Page 1 of 1 |
| APPLICATION NO. | : 10/561694 | |
| DATED | : October 27, 2009 | |
| INVENTOR(S) | : Thomas Korssell | |

It is certified that error appears in the above-identified patent and that said Letters Patent is hereby corrected as shown below:

Column 5, Line 14: Please delete "161"; replace with --101--

Signed and Sealed this

Fifth Day of January, 2010

David J. Kappos
*Director of the United States Patent and Trademark Office*

UNITED STATES PATENT AND TRADEMARK OFFICE
CERTIFICATE OF CORRECTION

PATENT NO. : 7,609,010 B2
APPLICATION NO. : 10/561694
DATED : October 27, 2009
INVENTOR(S) : Thomas Korssell It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 691 days.

Signed and Sealed this

Twelfth Day of October, 2010

David J. Kappos
*Director of the United States Patent and Trademark Office*